(12) United States Patent
Dispensa et al.

(10) Patent No.: US 8,438,302 B2
(45) Date of Patent: May 7, 2013

(54) SPLITTING AND SHARING ROUTING INFORMATION AMONG SEVERAL ROUTERS ACTING AS A SINGLE BORDER ROUTER

(75) Inventors: Jean-Claude Dispensa, Saint Jeannet (FR); Arnaud Lund, Cagnes sur Mer (FR)

(73) Assignee: International Business Machines Corporation, Armonk, NY (US)

( * ) Notice: Subject to any disclaimer, the term of this patent is extended or adjusted under 35 U.S.C. 154(b) by 3816 days.

(21) Appl. No.: 10/621,669

(22) Filed: Jul. 17, 2003

(65) Prior Publication Data

US 2004/0039840 A1     Feb. 26, 2004

(30) Foreign Application Priority Data

Aug. 22, 2002  (EP) .................................... 02368090

(51) Int. Cl.
G06F 15/173        (2006.01)
(52) U.S. Cl.
USPC ............ 709/238; 709/239; 709/240; 709/242
(58) Field of Classification Search ................... 709/238
See application file for complete search history.

(56) References Cited

U.S. PATENT DOCUMENTS

| | | | |
|---|---|---|---|
| 5,396,622 A * | 3/1995 | Lee et al. ........................... | 707/7 |
| 5,721,819 A * | 2/1998 | Galles et al. ................... | 709/243 |
| 5,926,463 A * | 7/1999 | Ahearn et al. ................. | 370/254 |
| 6,141,325 A | 10/2000 | Gerstel .......................... | 370/238 |
| 6,148,410 A * | 11/2000 | Baskey et al. ..................... | 714/4 |
| 6,266,335 B1 * | 7/2001 | Bhaskaran ..................... | 370/399 |
| 6,611,872 B1 * | 8/2003 | McCanne ...................... | 709/238 |
| 6,711,172 B1 * | 3/2004 | Li ................................. | 370/401 |
| 6,744,739 B2 * | 6/2004 | Martin .......................... | 370/254 |
| 6,760,775 B1 * | 7/2004 | Anerousis et al. ............ | 709/238 |
| 6,778,498 B2 * | 8/2004 | McDysan ..................... | 370/231 |
| 6,826,195 B1 * | 11/2004 | Nikolich et al. .............. | 370/465 |
| 6,895,461 B1 * | 5/2005 | Thompson .................... | 710/305 |
| 6,914,886 B2 * | 7/2005 | Peles et al. .................... | 370/254 |
| 6,915,457 B1 * | 7/2005 | Miller ............................ | 714/43 |
| 7,065,587 B2 * | 6/2006 | Huitema et al. .............. | 709/245 |
| 7,072,958 B2 * | 7/2006 | Parmar et al. ................ | 709/223 |
| 7,111,073 B1 * | 9/2006 | Jain et al. ...................... | 709/241 |
| 7,159,036 B2 * | 1/2007 | Hinchliffe et al. ............ | 709/242 |

(Continued)

OTHER PUBLICATIONS

"Faster 'Net growth rate raises fears about routers", Carolyn Duffy Marsan, Network World, Apr. 2, 2001, (http://www.nwfusion.com/news/2001/0402routing.html).

*Primary Examiner* — Richard G Keehn
(74) *Attorney, Agent, or Firm* — Patrick J. Daugherty; Driggs, Hogg, Daugherty & Del Zoppo Co., LPA

(57) ABSTRACT

A method, system, and computer program product for splitting and sharing routing information among several routers within a group of routers acting as a single border router in an Internet protocol (IP) network, each router comprising a routing table. The method, for use in a router of the group, comprises the steps of: selecting routes in the routing table of the router; requesting other routers of the group to replace, in their routing tables, each selected route with the router as next hop; associating at least part of-non selected routes, each one with another router of the group; and removing and replacing, in the routing table, each-non selected route associated with a router of the group by the associated router as next hop.

7 Claims, 6 Drawing Sheets

U.S. PATENT DOCUMENTS

| | | | |
|---|---|---|---|
| 7,289,433 B1* | 10/2007 | Chmara et al. | 370/219 |
| 7,423,979 B2* | 9/2008 | Martin | 370/255 |
| 2001/0036161 A1* | 11/2001 | Eidenschink et al. | 370/316 |
| 2002/0051449 A1* | 5/2002 | Iwata | 370/389 |
| 2002/0062388 A1* | 5/2002 | Ogier et al. | 709/238 |
| 2002/0118682 A1* | 8/2002 | Choe | 370/395.31 |
| 2002/0163884 A1* | 11/2002 | Peles et al. | 370/229 |
| 2003/0023711 A1* | 1/2003 | Parmar et al. | 709/223 |
| 2003/0069990 A1* | 4/2003 | D'Annunzio et al. | 709/242 |
| 2003/0126233 A1* | 7/2003 | Bryers et al. | 709/219 |
| 2007/0263553 A1* | 11/2007 | Bharali et al. | 370/254 |

* cited by examiner

SPLITTING AND SHARING ROUTING INFORMATION AMONG SEVERAL ROUTERS ACTING AS A SINGLE BORDER ROUTER

FIELD OF THE INVENTION

The present invention concerns computer networks, and more particularly a method and system, in an Internet Protocol (IP) network, for splitting and sharing Border Gateway Protocol (BGP) routing information among several routers acting as a single border router.

BACKGROUND

The Internet is a global network of interconnected computers and computers networks that use a variety of different operating systems or languages, including UNIX, DOS, Windows, Macintosh, and others. To enable communication among these various systems and languages, the Internet uses a language called TCP/IP (Transmission Control Protocol/Internet Protocol). TCP/IP supports three basic applications on the Internet: transmitting and receiving electronic mail, logging into remote computers (the Telnet), and transferring files and programs from one computer to another (FTP or File Transfer Protocol).

A primary design goal of TCP/IP is to interconnect networks that provide universal communication services, i.e., an "internetwork", or "Internet". Each physical network has its own technology dependent communication interface, in the form of a programming interface, which provides basic communication functions running between the physical network and the user applications. The architectures of the physical networks are hidden from the user. Another goal of TCP/IP is to interconnect different kinds of physical networks to form what appears to the user to be one large network.

The TCP/IP protocol suite is named for two of the most important protocols, namely Transmission Control Protocol (TCP), and Internet Protocol (IP). Another name for it is the Internet Protocol Suite. The more common term TCP/IP is used to refer to the entire protocol suite.

TCP is a transport layer protocol providing end-to-end data transfer. It is responsible for providing reliable exchange of information between two computer systems. Multiple applications can be supported simultaneously over a single TCP connection between two computer systems.

IP is an internetwork layer protocol hiding the physical network architecture below it. Messages exchanged between computers include a routing function that ensures that the messages will be correctly directed within the network to be delivered to their destinations. IP provides this routing function. An IP message may be called an IP Datagram.

Application Level protocols are used on top of TCP/IP to transfer user and application data from an origin computer system to a destination computer system. Such Application Level protocols are, for example, File Transfer Protocol (FTP), Telnet, Gopher, and Hyper Text Transfer Protocol (HTTP).

With the increasing size and complexity of the Internet, tools called navigators or navigation systems have been developed to help find information on the network. Early navigation systems include standards such as Archie, Gopher, and WAIS.

More recently, the navigation system widely known as the World Wide Web ("WWW" or "the Web") has emerged. The Web is an Internet-based navigation system, an information distribution and management system for the Internet, and a dynamic format for communicating on the Web.

The Web seamlessly integrates information that has a wide variety of formats, including still images, text, audio, and video. A user of the Web with a graphical user interface (GUI) may communicate transparently with different host computers and different system applications (including FTP and Telnet), using different information formats for files and documents including, for example, text, sound and graphics.

A "Router" is a computer that interconnects two networks and forwards messages from one network to the other. Routers are able to select the best transmission path between networks. The basic routing function is implemented in the IP layer of the TCP/IP protocol stack, so any host (or computer) or workstation running TCP/IP over more than one interface could, in theory, forward messages between networks. Because IP implements the basic routing functions, the term "IP Router" is often used. However, dedicated network hardware devices called "routers" can provide more sophisticated routing functions than the minimum functions implemented in IP.

When data is sent to a remote destination, each IP datagram is first sent to a local router. An incoming datagram that specifies a destination IP address other than one of the local router IP address is treated as a normal outgoing datagram. This outgoing datagram is subject to the IP routing algorithm of the router, which selects the next hop for the datagram. The router forwards each datagram towards its final destination. A datagram travels from one router to another until it reaches a router connected to the destination. Each intermediate router along the end-to-end path selects the next hop used to reach the destination. The next hop represents the next router along the path to reach the destination. This next router can be located on any of the physical networks to which the intermediate router is attached. If it is a physical network other than the one on which the host originally received the datagram, then the result is that the intermediate router has forwarded the IP datagram from one physical network to another.

An IP routing table in each router is used to forward datagrams between networks. A basic IP routing table comprises information about the locally attached networks and the IP addresses of other routers located on these networks, plus the networks they attach to. A routing table can be extended with information on IP networks that are farther away, and can also comprise a default route, but it still remains a table with limited information. A routing table represents only a part of the whole IP network. A router having such a routing table is called "a router with partial routing information."

A robust routing protocol must provide the ability to dynamically build and manage information in the IP routing table. As changes in the network topology may occur, the routing tables must be updated with minimal intervention, and preferably without manual intervention.

IP addresses are used by the IP protocol to uniquely identify a host on the Internet. Strictly speaking, an IP address identifies an interface that is capable of sending and receiving IP datagrams. Each IP datagram (the basic data packets that are exchanged between hosts) comprises a source IP address and a destination IP address. An IP address may be represented by a 32-bit unsigned binary value expressed in a dotted decimal format. For example, 9.167.5.8 is a valid Internet address. Such an IP address is divided between a network part and a host part. The first bits of the IP address specify how the rest of the address is divided. The mapping between the IP address and an easier-to-read symbolic name, for example myhost.ibm.com, is done by the "Domain Name System" (DNS).

An IP address comprises a list four numbers in the range 0 to 255 separated by periods. All possible addresses in the IP network (in other words, the entire IP address space) are between address 0.0.0.0 and address 255.255.255.255. The total number of available IP addresses is 2 raised to the power 32. An IP address can also be represented by converting each digit to a binary value. For example, the IP address "0.1.2.3" can be represented by the binary value "00000000 00000001 00000010 00000011".

An address which results from adding 1 to the binary representation of a first address is considered to be "contiguous" to the first address. The total address space can be split into smaller blocks of contiguous addresses using a binary mask. These blocks of contiguous addresses are called "subnetworks" or "subnets." A subnet is defined by two values: the size of the mask to apply (a number "n" between 0 and 32), and the first address of the block (which must be a multiple of 2 to the power (32−n)). Once these two values are given, it is easy to check whether an address "x" belongs to this subnet by applying the binary mask to the binary representation of the IP address "x". The result must be equal to the first address of the subnet. The mask is applied to an address by means of a logical "AND" operation between the bits of the mask and the corresponding bits of the address in question. As the mask is a characteristic of the subnet, it is usually called the "subnet mask". The subnet mask is entirely defined by its length "n" currently denoted "/n".

For instance, the subnet defined by the subnet mask /30 and the address 1.1.1.0 has the block of contiguous addresses between 1.1.1.0 and 1.1.1.3, with the four addresses 1.1.1.0, 1.1.1.1, 1.1.1.2, and 1.1.1.3. In other words, mask /30 can be represented by the binary string "11111111 11111111 11111111 11111100". An address belongs to the subnet previously defined if, when the binary mask /30 is applied to the binary representation of the address, the result is equal to the first address of the subnet, in the present case "00000001 00000001 00000001 00000000". For example, if the mask /30 is applied to the address "1.1.1.2" represented by the string "00000001 00000001 00000001 00000010", the result is equal to "00000001 00000001 00000001 00000000" which is the first address of the subnet. Therefore the address "1.1.1.2" belongs to the subnet. On the contrary, if the same operation is done on address "2.2.2.2" represented by the binary string "00000010 00000010 00000010 00000010", the result is "00000010 00000010 00000010 00000000". The result is different from the first address of the subnet. Therefore, address "2.2.2.2" does not belong to the subnet.

More-intelligent routers are required if the router needs to know routes to all possible IP networks; if the router needs to have dynamic routing tables, which are kept up-to-date with minimal or no manual intervention; and if the router must be able to advertise local changes to other routers.

Advanced forms of routers use additional protocols to communicate with each other. A number of protocols of this kind exist. For instance, a group of networks, called an "Autonomous System" (AS) in Internet terminology, is administered as a unit. Routing within an Autonomous System (AS) and routing outside an Autonomous System (AS) are treated as different issues and are addressed by different protocols.

An Autonomous System (AS) is defined as a logical portion of a larger IP network. An AS normally comprises an internetwork within an organization. It is administered by a single management authority. An AS can connect to another AS managed by the same organisation. It can also connect to other public or private networks.

Some routing protocols are used to determine the routing path within an AS, and others are used between a plurality of Autonomous Systems. Exterior Gateway Protocols (EGPs) allow the exchange of summary information between separately administered Autonomic Systems. An example of this type of routing protocol is the Border Gateway Protocol (BGP), which is also called EBGP for Exterior Border Gateway Protocol. Interior Gateway Protocols (IGPs) allow routers to exchange information within an AS. Examples of these protocols are Open Short Path First (OSPF) and Routing Information Protocol (RIP). The routing protocol BGP can also be used within an AS as IGPs. In this particular case, BGP is called Internal Border Gateway Protocol (IBGP).

The Exterior Gateway Protocol (EGP) has particular historical interest. It was one of the first protocols developed to communicate between Autonomous Systems. This protocol is described in RFC 904. EGP assumes that the network comprises a single backbone, and that a single path exists between any two Autonomous Systems. Due to this limitation, the current use of EGP is minimal. In practice, EGP has been replaced progressively by BGP. EGP is based on periodic polling using hello/I-hear-you message exchanges, to monitor neighbor reachability and poll requests to solicit update responses. Exterior gateways connected to an AS can advertise only those destinations networks reachable entirely within that gateway's AS. An exterior gateway using EGP passes along information to its EGP neighbors but does not advertise reachability information about its EBGP neighbors (gateways are neighbors if they exchange routing information) outside the AS. The routing information from inside an AS must be collected by this EGP gateway, usually via an Interior Gateway Protocol (IGP).

Border Gateway Protocol (BGP) is an Exterior Gateway Protocol. It was originally developed to provide a loop-free method for exchanging routing information between Autonomous Systems. BGP has since evolved to support the aggregation and summary of routing information. BGP is an IETF draft standard protocol described in RFC 1771. The version described in this RFC is BGP version 4 (BGP-4).

A system running the Border Gateway Protocol (BGP) is called a "BGP speaker." BGP speakers exchanging inter AS routing information are called "BGP neighbors." BGP neighbors can be of two types:
  Internal: a pair of BGP neighbors in the same Autonomous System. Internal BGP neighbors must present a consistent image of the AS.
  External: a pair of BGP neighbors in different Autonomous Systems. External BGP neighbors must be connected by a BGP connection.

A "BGP session" is a TCP session established between BGP neighbors exchanging routing information using BGP. The neighbors monitor the state of the session by sending a "keep-alive" message regularly.

A "border router" or "border gateway" is a router that has a connection to multiple Autonomous Systems. The IP address of a border router is specified as a next hop destination when BGP advertises an AS path (list of the AS numbers traversed by a route when exchanging routing information) to one of its external neighbors. Next hop border routers share a physical connection with both the sending and receiving BGP speakers.

BGP defines two types of connections, physical connections and BGP connections.

In a physical connection, an AS shares a physical network with another AS, and this network is connected to at least one border router from each AS. Since these two routers share a network, they can forward datagrams to each other without requiring any inter-AS or intra-AS routing protocols.

In a BGP connection, there is a BGP session between a pair of BGP speakers, one in each AS. This session is used to communicate the routes through the physically connected border routers that can be used for specific networks. BGP requires that the BGP speakers must be on the same network as the physically connected border routers so that the BGP session is also independent of all inter-AS or intra-AS routing protocols. The BGP speakers do not need to be border routers, and vice versa. The term BGP connection can be used to refer to a session between two BGP speakers in the same AS.

Routing policies are not defined in the BGP protocol. Rather, they are selected by the AS authority and presented to BGP in the form of implementation specific configuration data. Each BGP speaker must evaluate different paths to a destination from the border routers for an AS connection, select the best one that complies with the routing policies in force, and advertise that route to all of its BGP neighbors at that AS connection. Rather than exchange simple metric counts, BGP communicates entire paths to its neighbors. BGP determines a preference order by applying a function mapping each path to a preference value and selects the path with the highest value.

BGP advertises only routes that it uses itself to its neighbors. That is, BGP conforms to the normal Internet hop-by-hop paradigm, even through it has additional information in the form of AS paths and is theoretically capable of informing a neighbor of a route it would not use itself. When two BGP speakers form a BGP session, they begin by exchanging their entire routing tables. Routing information is exchanged via "update" messages. In addition to the reachability and next hop information, the routing information contains the complete AS path to each listed destination in the form of a list of AS numbers. After BGP neighbors have performed their initial exchange of their complete routing databases, they exchange only updates to that information.

The Border Gateway Protocol (BGP) is used by BGP routers to route datagrams in the Internet Protocol (IP) network. According to this protocol, the various BGP routers exchange routing tables. Each router adds the routes it learns from its BGP neighbors to the routes stored in its own routing table, and then propagates this table to its neighbors. The routes are transmitted from one router to another. Consequently, the size of the routing table of each router can rapidly become very large. At the end, the routing table can contain all routes known by every router participating in the Border Gateway Protocol (BGP) on the Internet; this table is called "the full Internet table".

With the rapid expansion of Internet, the size of the "full Internet table" has grown very rapidly. As a result, the size of the memory required to store such a table in a router and the data processing capacity required to manage it can present a significant problem. The technical literature has discussed the problem raised by this expansion. For example, see "Faster 'Net growth rate raises fears about routers" by Carolyn Duffy Marsan in *Network World*, Apr. 2, 2001 (http://www.nwfusion.com/news/2001/0402routing.html), which indicates that the Internet is growing in size and complexity at a rate faster than today's routers can handle. After years of predictable growth, the size of the routing table and traffic is exploding.

To cope with the size increase of routing tables, manufacturers have continuously increased the power available in their routers in terms of memory for storing the tables, and in terms of data processing for consulting and updating the tables. In fact, network designers must either develop more powerful (and more expensive) routers in proportion to the size of the routing tables, or find a way to artificially limit or decrease the size of the routing tables. In the latter case, the usual technique is to implement a filter and to discard some of the table entries, typically entries related to small networks. However, this loss of information has its own drawbacks, especially if the routing that results is no longer optimal.

As table size increases, some of the routers within a network may abruptly reach their limits. Suddenly, networks that were operating properly encounter problems related to the capacity of routers to route the traffic. When this happens, one solution is to replace old routers with new routers that are more powerful. Another solution is to deliberately reduce the size of the full Internet table by discarding some routes and by filtering, as mentioned above.

SUMMARY

In response to these and other problems, it is an object of the present invention to provide a way of replacing the BGP router, when the size of the routing table exceeds its storing and processing capacity, by a group of routers, without requiring each of the replacement routers to have the capacity to manage the entire routing table alone. A further object of the present invention is to split the entire routing table of a BGP router among a plurality of routers that act in a cooperative way, each router of the plurality storing a portion of the entire routing table, so that the size of the routing table stored in each router is significantly reduced, thereby solving the problem of memory size and processing power required in each router.

The present invention includes a method, system, and computer program for splitting and sharing routing information among several routers or between two routers within a group of routers acting as a single border router in an Internet protocol (IP) network, where each router includes a routing table. The method, for use in a router of the group, comprises the steps of:

selecting routes in the routing table of the router;
requesting other routers of the group to replace, in their routing tables, each selected route with the router as next hop;
associating at least part of non-selected routes, each one with another router of the group;
removing and replacing, in the routing table, each non-selected route associated with a router of the group by the associated router as next hop.

BRIEF DESCRIPTION OF THE DRAWINGS

The foregoing, together with other objects, features, and advantages of this invention can be better appreciated with reference to the following detailed description and drawings, wherein.

DETAILED DESCRIPTION

Before describing the details of specific embodiments, it will be helpful to understand from a more general perspective the various elements and methods which may be related to the present invention.

Figure 1:
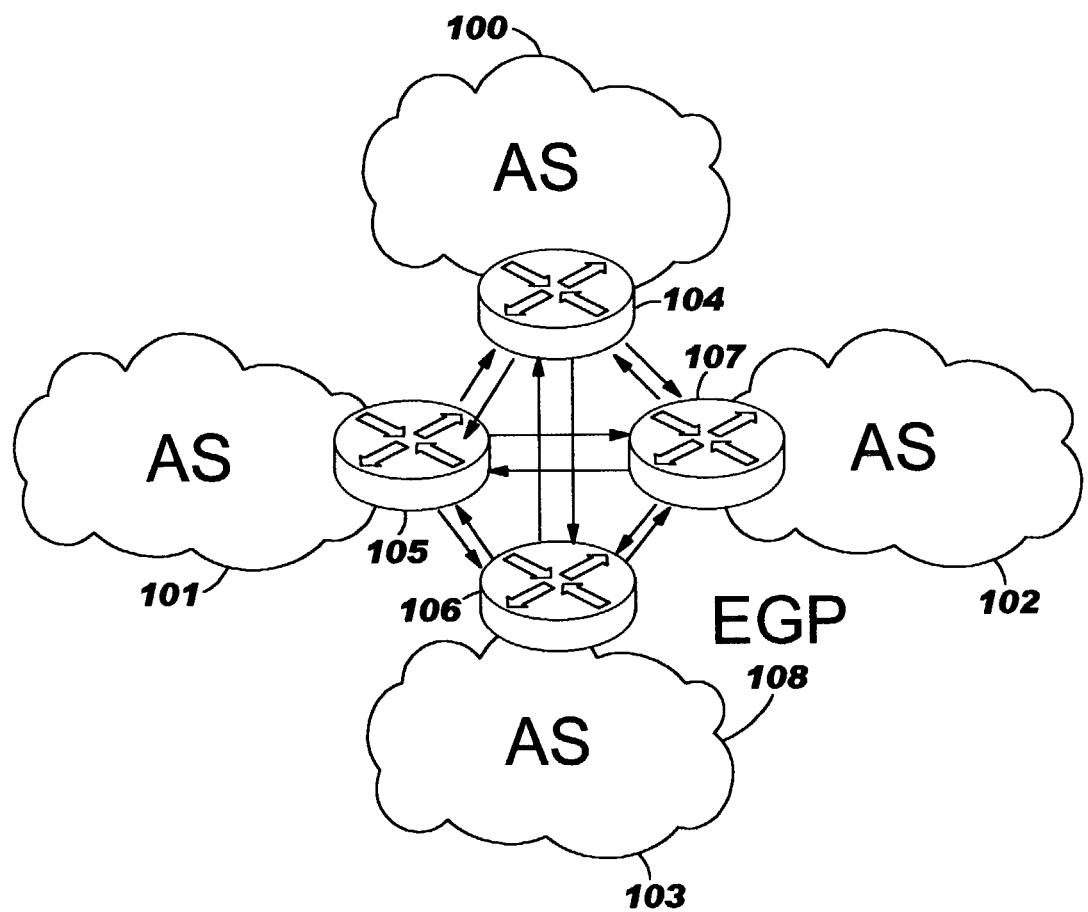
FIG. 1 is a general view of several Autonomous Systems interconnected by routers using an Exterior Gateway Protocol (EGP) to exchange routing information.

FIG. 1 is a general view of a network comprising several Autonomous Systems AS (100, 101, 102, 103) interconnected via border routers (104, 105, 106, 107). The border routers exchange routing information related to the different Autonomous Systems using the Exterior Gateway Protocol (EGP) (108). Today, Border Gateway Protocol (BGP) is the protocol most commonly used between the public IP network (Internet) and private IP networks considered as Autonomous Systems (AS).

Figure 2:
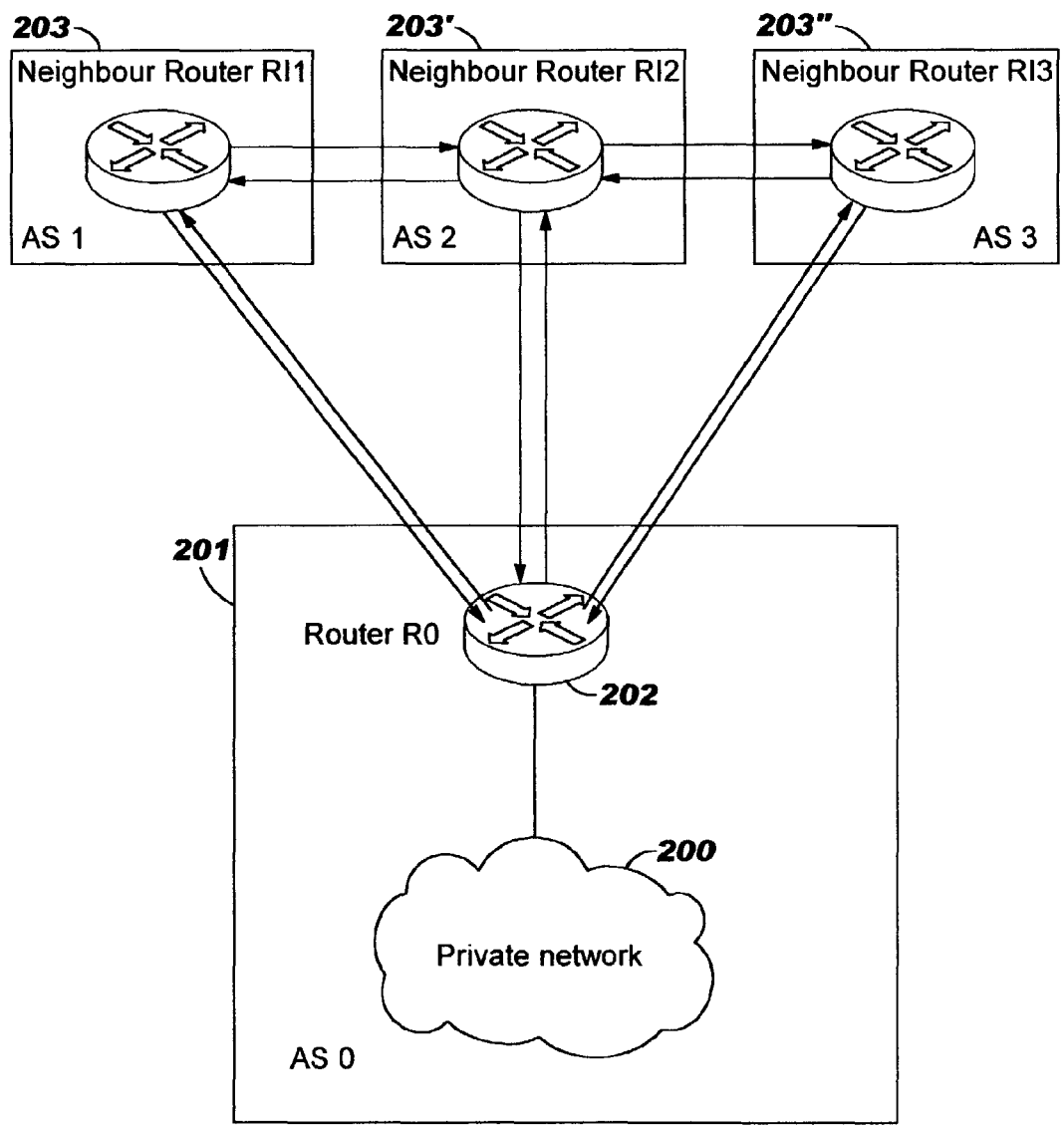
FIG. 2 is a view of a typical network where a Border Gateway Protocol (BGP) router acts as a gateway between a private IP network and the Internet.

FIG. 2 shows a typical situation that is useful for illustrating the problem generated by large routing tables in Border Gateway Protocol (BGP) routers. A private IP network (AS 0) (200), administered by a private company or a service provider, is connected (201) to other IP networks (AS 1, AS 2, AS 3) by a BGP router (200) acting as gateway. As shown in FIG. 2, BGP router R0 (202) connects several BGP routers (203) (RI1, RI2, and so forth). These BGP routers (203) are considered to be BGP neighbors by router R0 (202). BGP sessions are established between BGP router R0 and the BGP neighbors, and the routing tables are exchanged. When router R0 (202) experiences problems with the size of the routing table, the most common solution is to replace this router R0 by a more powerful BGP router.

Figure 3:
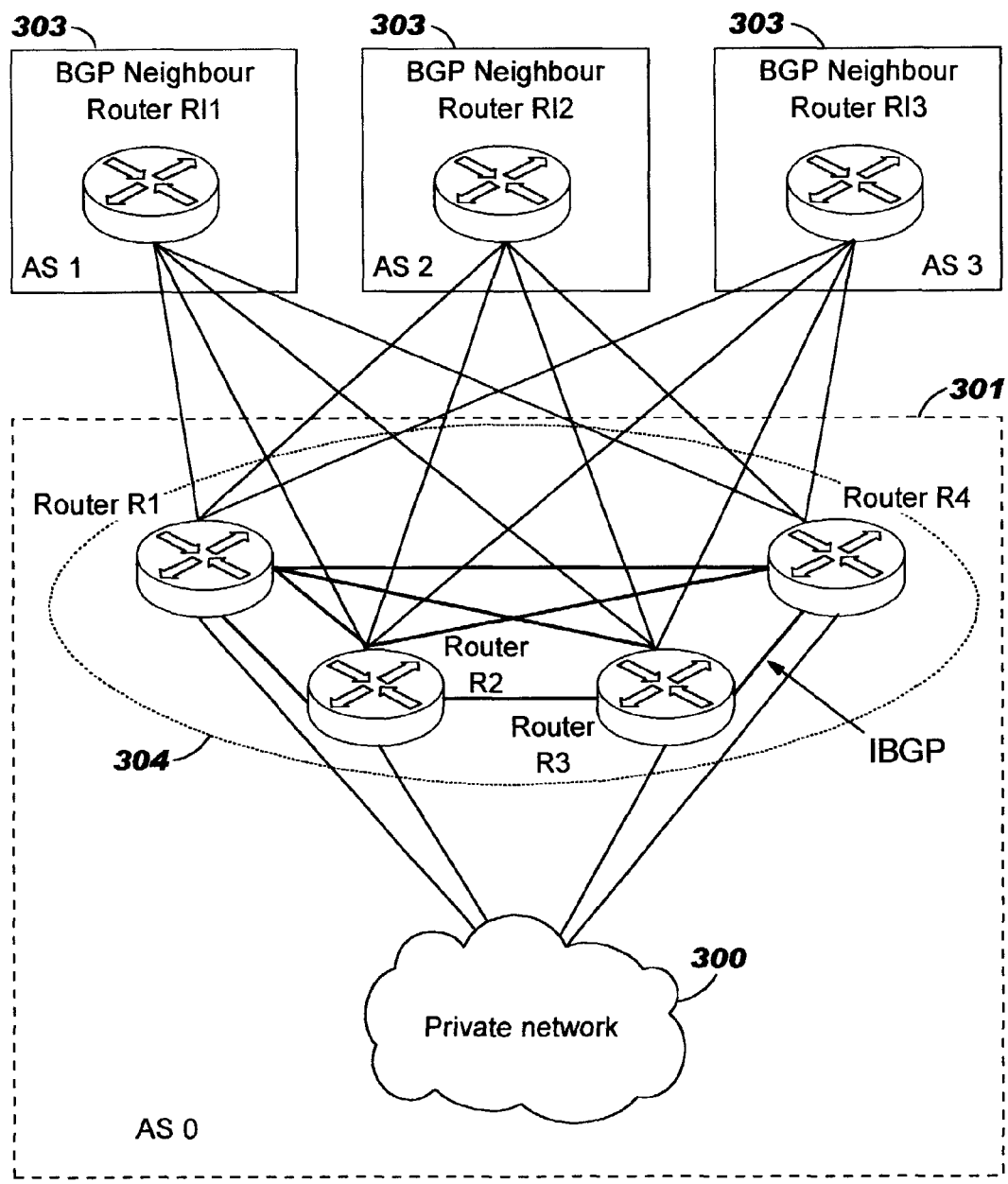
FIG. 3 is a view of a network where a group of routers act as a gateway between a private IP network and the Internet, wherein routing information is split and shared among the routers according to the present invention.
Figure 4:
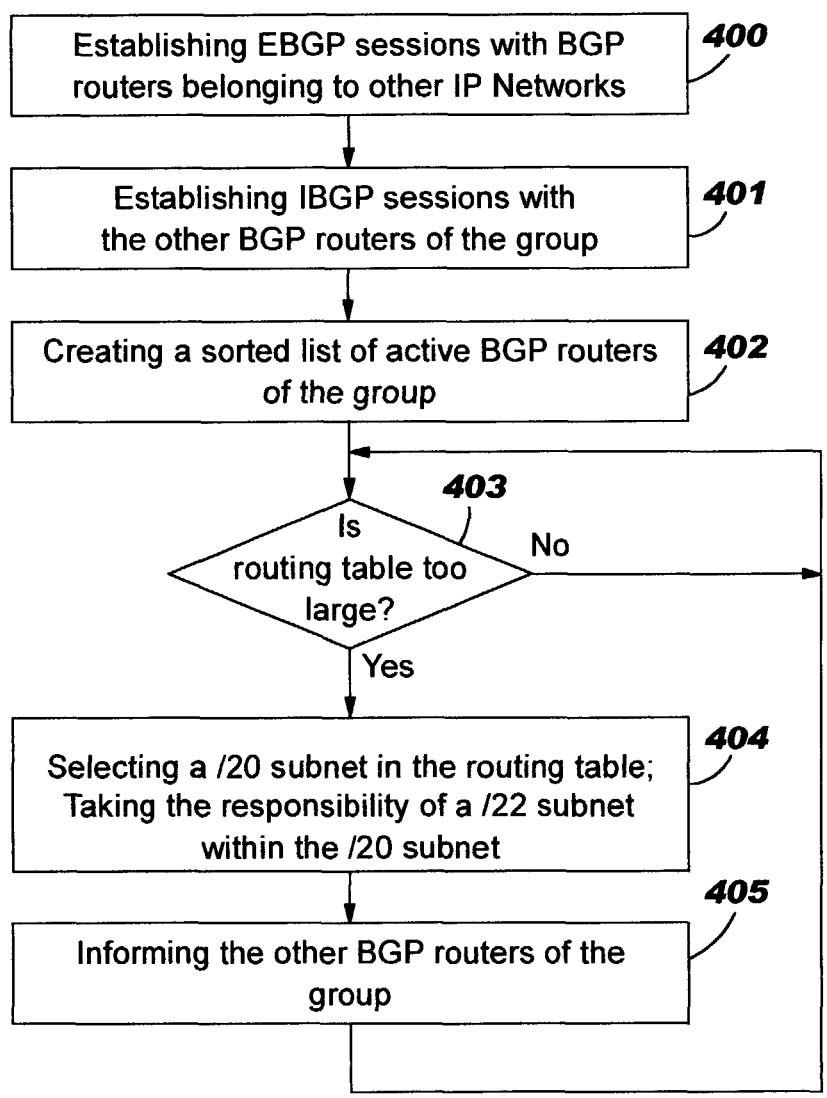
FIG. 4 is a flow chart showing steps of the method of splitting and sharing routing information among a group of routers acting a a single border router, and the steps performed by a BGP router initiating the split of the routing table according to the present invention.
Figure 5:
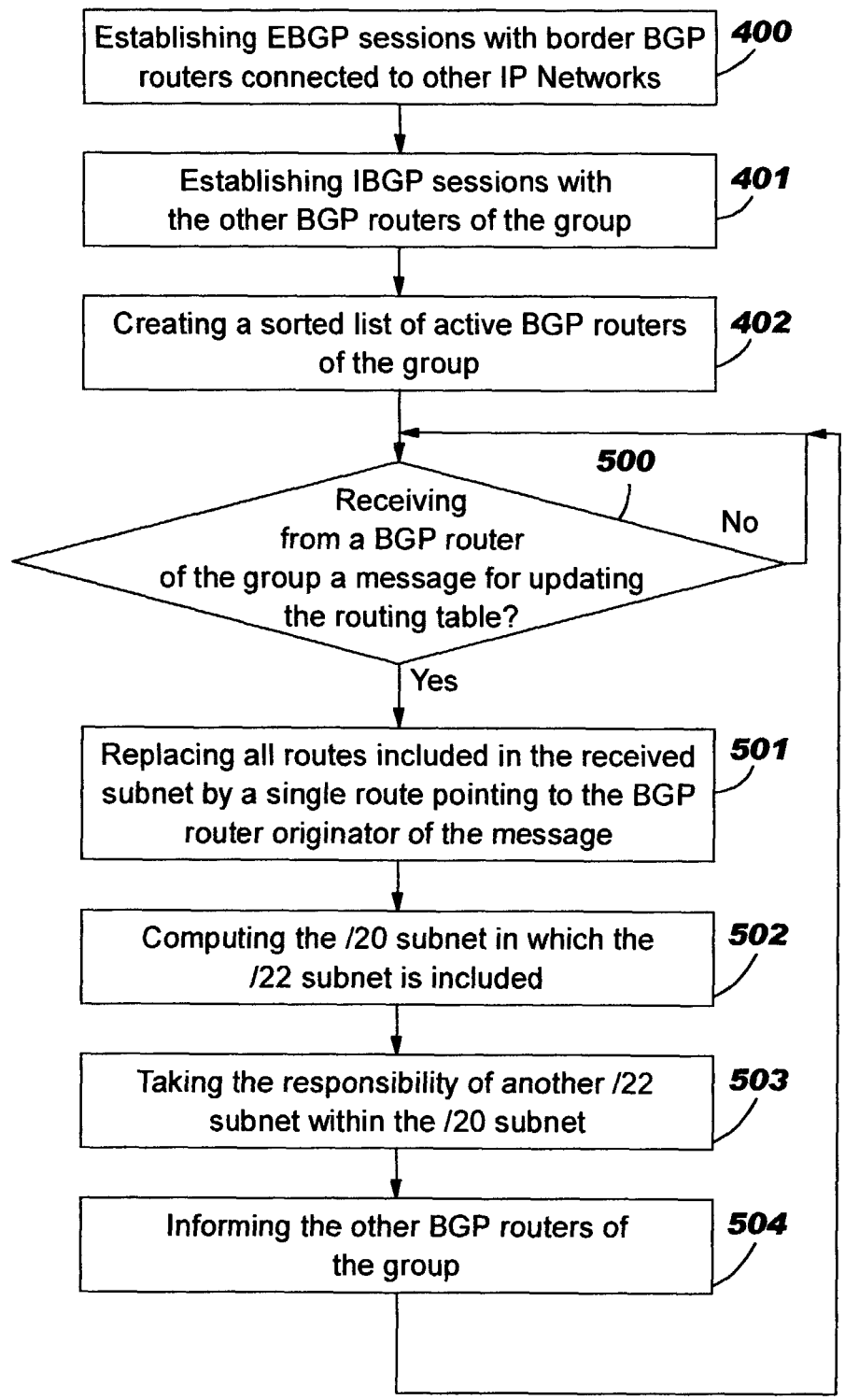
FIG. 5 is a flow chart showing steps of the method of splitting and sharing routing information among several routers acting as a single border router.

Instead of replacing BGP router R0 (202) by a more powerful router, the present invention includes a method and system for using several routers together as a group. As shown in FIG. 3, BGP router R0 (302) is replaced by a plurality of BGP routers (304) (R1,R2,R3,R4) forming a group. These BGP routers cooperate by sharing their routing tables in an inventive way to perform the same function as BGP router R0 (202) in FIG. 2. The joint action of the BGP routers (304) of the group allows them to access the same routing information as BGP router R0, even if none of them, considered separately, is able to handle the entire routing table.

The group is initialized as follows. First, each router member of the group (304) of BGP routers participating according to the present invention must know the IP address of all other members of the group. In a first step, each BGP router of the group (304) establishes a BGP session (305) (also called EBGP session) through the Internet with each BGP neighbor (303) (RI1, RI2, RI3). In the example illustrated by FIG. 3, BGP router R1 (304) establishes an EBGP session (305) with each of its BGP neighbors (303) (RI1, RI2, RI3). At initialization time, each router of the group (304) establishes an IBGP session (306) with the other members of the group. Each BGP router of the group keeps an ordered list of active members of the group (304) (including itself). The method of ordering this list must be the same in all BGP routers within the group. However, different methods using different criteria can be used to sort the list. A simple option is to order the list by ascending IP address.

If, during the normal operations, one of the established BGP sessions is lost, or if a BGP session which initially failed is finally established, all BGP sessions are reset, including the EBGP (306) sessions with the BGP neighbors (303) (RI1, RI2, RI3). The routing tables are cleared of any information related to the sessions. All sessions are reinitialized and reestablished according to the process previously described. The list of active BGP routers in each BGP router of the group is reordered.

At the beginning, no route is advertised on the IBGP sessions between the different members of the group (304). Each member monitors the size of its own routing table. As long as the size of the routing table remains below a predefined threshold, no particular action is taken. When the size of the routing table goes beyond a predefined threshold, the BGP router decides to reduce the size of its routing table according to the process described below.

Reducing the size of the routing table of a BGP router is based on the following principle: the entire routing table is split according to several subnets or subnetworks and shared among the different BGP routers of the group. A BGP router within the group may decide to take responsibility for routing the IP traffic intended for one of these subnetworks. The BGP router informs the other members of the group that it is ready to receive the IP traffic from them directed to this subnetwork. As a consequence, all other BGP routers of the group can remove, from their own routing tables, the routes related to this subnetwork. These routes are replaced by a single route pointing to the BGP router within the group that is in charge of this subnetwork. The process can be repeated, and each router can become responsible for one or more subnetworks.

Below is an example illustrating a method and system according to the present invention. For the purpose of discussion, a mask of /20 will be used. This parameter is configurable. In this particular example, the full Internet table is shared among the four BGP routers (R1, R2, R3, R4) of the group acting as a single BGP router (naturally, it is possible to use another number of routers). The IP addresses of these routers are in this same order.

The inventive method comprises the following steps:

Initialization of the Group of Routers: At initialization time, each BGP router (R1, R2, R3 R4) of the group (304) establishes an EBGP session with its BGP neighbors (303) (BGP routers RI1, RI2, RI3) (Step 400). Each BGP router establishes an IBGP session with all other BGP routers of the group. Each BGP router of the group has been configured with the IP address of the other BGP routers of the group with which it will share the routing tables (Step 401). At the end of this session establishment, each BGP router of the group builds a list with the active BGP routers of the group and orders this list (for instance by ascending IP address) (Step 402). The present example assumes that all BGP routers of the group are active and have successfully established an IBGP session with other BGP routers of the group. At the end of this step, each BGP router has built a list comprising routers "R1, R2, R3, R4". At that time, no route is advertised on the IBGP sessions established between the different BGP routers of the group.

Split of the Routing Table of a Router between the other Routers of the Group: When a BGP router of the group, for instance BGP router R1, detects that its routing table begins to exceed its storage and processing capabilities (when, for instance, the size of its routing table exceeds a predefined threshold) (step 403), this BGP router scans its routing table searching for a /20 subnet comprising a large number of routes pointing to networks smaller than /20 (step 404). BGP Router R1 splits the /20 subnet into four /22 subnets and decides to take responsibility for one of the four /22 subnets (the subnet corresponding to its order in the list previously built). In the present example, because router R1 is the first router in the list, it will take the responsibility for subnet number 1. If the /20 subnet selected by R1 starts with the address 1.1.0.0, then the four /22 subnets after the split of the routing table will start with addresses 1.1.0.0, 1.1.4.0, 1.1.8.0 and 1.1.1.2.0. Router R1 will take responsibility for the /22 subnet starting with address 1.1.0.0. (the first one). The BGP router with the full storage table then (405) informs other BGP routers of the group (R2, R3, R4) using the previously established IBGP sessions that it takes the responsibility for a /22 subnet (step 405). The other BGP routers of the group update their routing tables by replacing routes related to the subnet by a single route pointing to the subnet but with the BGP router R1 as next hop. In the present example, the route will be network address 1.1.0.0, network mask /22, next hop router R1.

Sharing of the Routing Table Among the Other Routers: Each BGP router of the group (routers R2, R3, R4) is initialized according to the process previously described (steps 400-402). Each BGP router of the group (routers R2, R3, R4) is invited by BGP router R1, via a message on previously established IBGP sessions, to update its routing table with a new route comprising BGP router R1 as next hop. At the receipt of this message (step 500), each BGP router (routers R2, R3, R4, R3) prepares itself to send IP traffic to BGP router R1. BGP router R2 removes from its routing table all routes under the responsibility of BGP router R1 and replaces them by the new route pointing to BGP router R1 (step 501). This operation allows reduction of the size of the routing table stored in BGP router R2. In the present example, BGP router R2 removes all routes included in the /22 subnet starting with 1.1.0.0, and adds the route: network address 1.1.0.0, network mask /22, and next hop router R1. The same process applies to BGP routers R3 and R4. BGP router R2 computes the /20 subnet including the /22 subnet for which the new route has been received, and computes the four /22 subnets that are part of it (step 503). These four /22 subnets are, respectively, mask /22, address 1.1.0.0.; mask /22, address 1.1.4.0.; mask /22, address 1.1.8.0.; and mask /22, address 1.1.12.0. BGP router R2 assigns itself the responsibility for one of the /22 subnets included in the /20 (the subnet corresponding to the order of its address in the list previously built). Because BGP router R2 is second in the router list, it will take responsibility for subnet 2. In the present example, the /22 subnet starting with 1.1.0.0 is included in a larger /20 subnet also starting with 1.1.0.0. The BGP router R2 then splits this larger subnet into four /22 subnets and assigns itself the second subnet starting with 1.1.4.0. BGP router R2 now behaves exactly as router R1. It informs all other routers in the group using the IBGP sessions that a single route with itself as next hop now points to the /22 subnet it has the responsibility for (step 504). In the present example, BGP router R2 informs the other routers of the group of the following route: network address 1.1.4.0, network mask /22, and next hop router R2.

Process Convergence: Each BGP router of the group behaves the same way. Each time a route is received from one of the BGP routers of the group, it replaces all routes comprised in the /22 subnet by a single route pointing to this router, takes responsibility for a /22 subnet, and sends the corresponding route to the other BGP routers of the group. At the end, each BGP router of the group is responsible of one of the /22 subnets, and has received, from each of the other BGP routers of the group, one route for each of the other /22 subnets comprised in the initial /20 subnet. Each BGP router has removed all the routes corresponding to each /22 subnet it is not responsible for, and has replaced the routes previously removed by a single route.

If one of the BGP routers experiences problems with the size of its routing table, this router will again initiate the routing table reduction process described above with another subnet.

Figure 6:
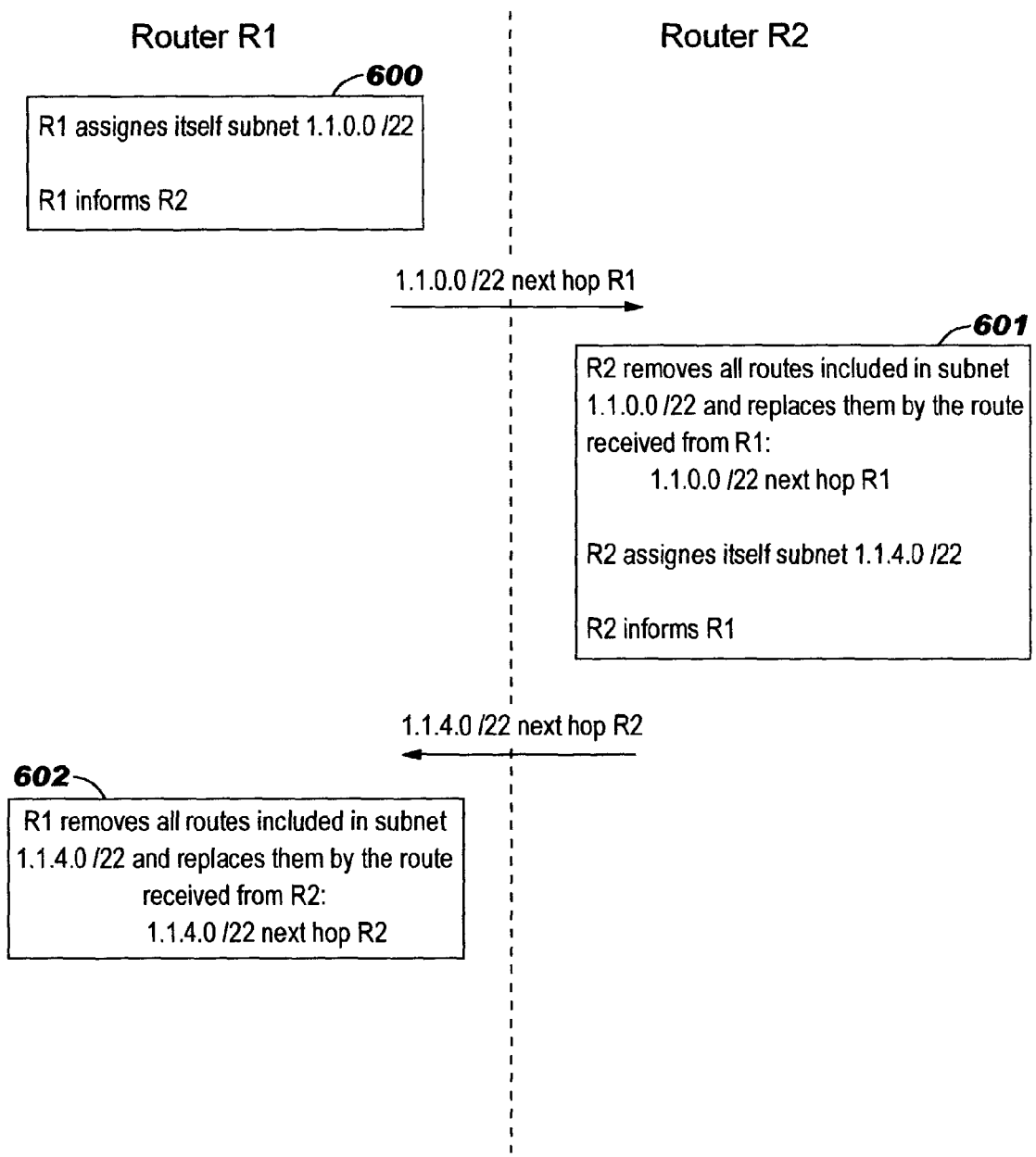
FIG. 6 shows the exchanges of messages between two routers sharing Border Gateway Protocol (BGP) routing tables according to the present invention.

FIG. 6 shows how two BGP routers within the group interact in order to split and share their routing tables. As described earlier, BGP router R1 initiates the process when the size of its routing table exceeds its storage and processing capabilities (for instance, when the size of its routing table exceeds a given threshold) (step 600). Router R1 assigns itself a subnetwork and informs the other BGP routers of the group to update their routing tables in order to route towards it the IP traffic intended for this subnetwork. In this particular example, router R1 sends a message to router R2 comprising information related to a new route: network address 1.1.0.0; network mask /22; next hop router R1. At receipt of this message, router R2 updates its routing table (Step 601). In the present example, all routes including subnetwork 1.1.0.0/22 are removed and replaced by a single route with router R1 as next hop. Then router R1 assigns itself a /22 subnetwork. Finally, router R2 sends a message with a new route to the other routers of the group, including router R1: network address 1.1.4.0; network mask /22; next hop R2. At reception of the message sent by R2, router R1 updates its routing table the same way as described previously for router R2 (Step 602). In the present example, all routes including subnetwork 1.1.4.0 /22 are removed and replaced by a single route with router R2 as next hop. Note that router R1 will receive a similar message from each BGP router of the group.

Recovery: The BGP router within the group detects the loss of an IBGP session (for example, because a BGP router in the group has failed), and the process is reinitialized. The BGP router resets all its IBGP sessions and rebuilds an ordered list with all the BGP routers participating in the group and which are sharing their routing tables. The process is the same when a BGP router of the group was initially in failure and then recovers (when the IBGP session with this router is reestablished). It is important to note that the temporary absence or unavailability of a BGP router in the group does not prevent the process from working. The process is just less efficient.

The following is another example illustrating a method according to the present invention. At the beginning of the process, the BGP routers of the group (routers R1, R2, R3, R4) establish EBGP sessions with their BGP neighbors (routers RI1, RI2, RI3) and receive the same routing table. In the present example the received routing table comprises the following information.

The initial routing table in BGP routers R1 R2 R3 R4 is:

| Network | Mask | Next Hop |
| --- | --- | --- |
| 1.1.0.0 | 255.255.240.0 (/20) | RI1 |
| 1.1.0.0 | 255.255.255.0 (/24) | RI2 |
| 1.1.1.0 | 255.255.255.0 (/24) | RI3 |
| 1.1.2.0 | 255.255.255.0 (/24) | RI2 |
| 1.1.4.0 | 255.255.252.0 (/24) | RI3 |
| 1.1.5.0 | 255.255.252.0 (/24) | RI2 |
| 1.1.6.0 | 255.255.252.0 (/24) | RI1 |
| 1.1.8.0 | 255.255.252.0 (/24) | RI3 |
| 1.1.9.0 | 255.255.252.0 (/24) | RI1 |
| 1.1.10.0 | 255.255.252.0 (/24) | RI2 |
| 1.1.12.0 | 255.255.252.0 (/24) | RI1 |
| 1.1.13.0 | 255.255.252.0 (/24) | RI3 |
| 1.1.14.0 | 255.255.252.0 (/24) | RI2 |

-continued

| Network | Mask | Next Hop |
|---------|------|----------|
| 1.1.16.0 | 255.255.252.0 (/20) | RI2 |
| 1.1.32.0 | 255.255.252.0 (/20) | RI3 |

BGP Routers R1 R2 R3 R4 also establish IBGP sessions between each other. At the beginning of the process, no information is advertised on these IBGP sessions. In this example, BGP routers R1, R2, R3, R4, have their IP addresses in the same order.

When BGP router R1 decides to reduce its routing table in response to problems of storage or processing capacity (or for any other problem), it first selects a /20 subnet comprising several routes. In the present example, BGP router R1 selects subnet 1.1.0.0 /20 and, using the IBGP sessions, announces to the other BGP routers of the group (R2, R3, R4), the following route: Network: 1.1.0.0; Mask /22; Next hop R1.

At receipt of this route, BGP router R2 assigns to itself a second /22 subnet 1.1.4.0 /22 and starts to reduce its routing table based on the route received from the BGP router R1. The routing table of BGP router R2 becomes as follows:

| Network | Mask | Next Hop |
|---------|------|----------|
| 1.1.0.0 | 255.255.240.0 (/20) | RI1 |
| 1.1.0.0 | 255.255.255.0 (/22) | R1 |
| 1.1.4.0 | 255.255.252.0 (/24) | RI3 |
| 1.1.5.0 | 255.255.252.0 (/24) | RI2 |
| 1.1.6.0 | 255.255.252.0 (/24) | RI1 |
| 1.1.8.0 | 255.255.252.0 (/24) | RI3 |
| 1.1.9.0 | 255.255.252.0 (/24) | RI1 |
| 1.1.10.0 | 255.255.252.0 (/24) | RI2 |
| 1.1.12.0 | 255.255.252.0 (/24) | RI1 |
| 1.1.13.0 | 255.255.252.0 (/24) | RI3 |
| 1.1.14.0 | 255.255.252.0 (/24) | RI2 |
| 1.1.16.0 | 255.255.252.0 (/20) | RI2 |
| 1.1.32.0 | 255.255.252.0 (/20) | RI3 |

BGP Router R2 sends to the other BGP routers of the group (routers R1, R3, R4), the following route, using the IBGP sessions: Network: 1.1.4.0; Mask /22; Next hop router R2.

At receipt of this route, BGP router R1 also proceeds with the reduction of the routing table. The routing table of BGP router R1 becomes as follows:

| Network | Mask | Next Hop |
|---------|------|----------|
| 1.1.0.0 | 255.255.240.0 (/20) | RI1 |
| 1.1.0.0 | 255.255.255.0 (/24) | RI2 |
| 1.1.1.0 | 255.255.255.0 (/24) | RI3 |
| 1.1.2.0 | 255.255.255.0 (/24) | RI2 |
| 1.1.4.0 | 255.255.255.0 (/22) | R2 |
| 1.1.8.0 | 255.255.252.0 (/24) | RI3 |
| 1.1.9.0 | 255.255.252.0 (/24) | RI1 |
| 1.1.10.0 | 255.255.252.0 (/24) | RI2 |
| 1.1.12.0 | 255.255.252.0 (/24) | RI1 |
| 1.1.13.0 | 255.255.252.0 (/24) | RI3 |
| 1.1.14.0 | 255.255.252.0 (/24) | RI2 |
| 1.1.16.0 | 255.255.252.0 (/20) | RI2 |
| 1.1.32.0 | 255.255.252.0 (/20) | RI3 |

In the meantime, BGP routers R3 and R4 receive the routes sent by BGP routers R1 and R2, and start the reduction of their routing tables. They send, to the other BGP routers of the group, the routes pointing to the subnets they take responsibility for, respectively, route Network: 1.1.8.0, Mask /22, Next hop R3, and route Network 1.1.12.0, Mask /22, Next hop R4.

The process converges to the following tables.

At router R1, the final routing table is:

| Network | Mask | Next Hop |
|---------|------|----------|
| 1.1.0.0 | 255.255.240.0 (/20) | RI1 |
| 1.1.0.0 | 255.255.255.0 (/24) | RI2 |
| 1.1.1.0 | 255.255.255.0 (/24) | RI3 |
| 1.1.2.0 | 255.255.255.0 (/24) | RI2 |
| 1.1.4.0 | 255.255.255.0 (/22) | R2 |
| 1.1.8.0 | 255.255.255.0 (/22) | R3 |
| 1.1.12.0 | 255.255.255.0 (/22) | R4 |
| 1.1.16.0 | 255.255.252.0 (/20) | RI2 |
| 1.1.32.0 | 255.255.252.0 (/20) | RI3 |

At router R2, the final routing table is:

| Network | Mask | Next Hop |
|---------|------|----------|
| 1.1.0.0 | 255.255.240.0 (/20) | RI1 |
| 1.1.0.0 | 255.255.255.0 (/22) | R1 |
| 1.1.4.0 | 255.255.252.0 (/24) | RI3 |
| 1.1.5.0 | 255.255.252.0 (/24) | RI2 |
| 1.1.6.0 | 255.255.252.0 (/24) | RI1 |
| 1.1.8.0 | 255.255.255.0 (/22) | R3 |
| 1.1.12.0 | 255.255.255.0 (/22) | R4 |
| 1.1.16.0 | 255.255.252.0 (/20) | RI2 |
| 1.1.32.0 | 255.255.252.0 (/20) | RI3 |

At router R3, the final routing table is:

| Network | Mask | Next Hop |
|---------|------|----------|
| 1.1.0.0 | 255.255.240.0 (/20) | RI1 |
| 1.1.0.0 | 255.255.255.0 (/22) | R1 |
| 1.1.4.0 | 255.255.255.0 (/22) | R2 |
| 1.1.8.0 | 255.255.252.0 (/24) | RI3 |
| 1.1.9.0 | 255.255.252.0 (/24) | RI1 |
| 1.1.10.0 | 255.255.252.0 (/24) | RI2 |
| 1.1.12.0 | 255.255.255.0 (/22) | R4 |
| 1.1.16.0 | 255.255.252.0 (/20) | RI2 |
| 1.1.32.0 | 255.255.252.0 (/20) | RI3 |

At router R4, the final routing table is:

| Network | Mask | Next Hop |
|---------|------|----------|
| 1.1.0.0 | 255.255.240.0 (/20) | RI1 |
| 1.1.0.0 | 255.255.255.0 (/22) | R1 |
| 1.1.4.0 | 255.255.255.0 (/22) | R2 |
| 1.1.8.0 | 255.255.255.0 (/22) | R3 |
| 1.1.12.0 | 255.255.252.0 (/24) | RI1 |
| 1.1.13.0 | 255.255.252.0 (/24) | RI3 |
| 1.1.14.0 | 255.255.252.0 (/24) | RI2 |
| 1.1.16.0 | 255.255.252.0 (/20) | RI2 |
| 1.1.32.0 | 255.255.252.0 (/20) | RI3 |

While the invention has been particularly shown and described with reference to a preferred embodiment, it will be understood that various changes in form and detail may be made therein without departing from the spirit and scope of the invention.

We claim:

1. A method for splitting and sharing routing information among several routers within a group of routers, comprising:
   providing a group of routers;
   each of the routers acting as a single border router in an Internet protocol network, each router comprising a routing table;
   comparing the size of the routing tables with a predefined threshold; and
   in response to the size of a routing table of a first of the group of routers exceeding the predefined threshold;
      splitting the first router's routing table into a plurality of subnetworks;
      a second of the routers taking responsibility for routing IP traffic intended for a one of the plurality of subnetworks by informing each of the other routers that it is ready to receive the IP traffic from the each of the other routers directed to the one subnetwork;
      in response to the informing, each of the other routers selecting and removing from their own routing table a route related to the one subnetwork and replacing the removed route by a single route pointing to the informing second router.

2. The method according to the claim 1, comprising the further step of forwarding IP traffic corresponding to a non-selected route, to a router of the group of routers associated with said non-selected route within the routing table.

3. The method according to claim 1, further comprising receiving from at least one of the other routers the IP traffic corresponding to the selected routes; and routing said IP received traffic.

4. The method according to claim 1, wherein the step of selecting routes in the routing table comprises the further step of selecting contiguous IP addresses within a given address range.

5. The method according to claim 1, comprising the preliminary steps of establishing sessions with other routers of the group; and creating a list of routers of the group.

6. The method according to claim 1, comprising the preliminary step of establishing sessions with other border routers.

7. The method according to claim 1, wherein routers within the group exchange routing information using Border Gateway Protocol.

* * * * *